United States Patent
Brandstätter (10) Patent No.: US 8,146,292 B2
(45) Date of Patent: Apr. 3, 2012

(54) INSERT CONTAINER

(75) Inventor: Conny Brandstätter, Fürth (DE)

(73) Assignee: Geobra Brandstatter GmbH & Co. KG, Zirndorf (DE)

( * ) Notice: Subject to any disclaimer, the term of this patent is extended or adjusted under 35 U.S.C. 154(b) by 3 days.

(21) Appl. No.: 12/557,667

(22) Filed: Sep. 11, 2009

(65) Prior Publication Data

US 2010/0077661 A1    Apr. 1, 2010

(30) Foreign Application Priority Data

Sep. 29, 2008 (DE) .......... 10 2008 049 361

(51) Int. Cl.
*A01G 27/04* (2006.01)
*A01G 27/00* (2006.01)

(52) U.S. Cl. ............................... 47/81; 47/79
(58) Field of Classification Search .......... 47/65.5, 47/66.6, 79, 80, 81, 48.5; D11/143, 152, D11/153
See application file for complete search history.

(56) References Cited

U.S. PATENT DOCUMENTS

| | | | | |
|---|---|---|---|---|
| 2,695,474 | A * | 11/1954 | Barstow | 47/81 |
| 3,137,096 | A * | 6/1964 | Hopkins | 47/79 |
| 4,001,967 | A * | 1/1977 | Swift et al. | 47/80 |
| 4,270,309 | A * | 6/1981 | Baumann | 47/59 R |
| 4,356,665 | A * | 11/1982 | de Oliveira | 47/80 |
| 4,916,858 | A * | 4/1990 | Hobson | 47/81 |
| 6,219,969 | B1* | 4/2001 | Dion | 47/79 |
| 6,226,921 | B1* | 5/2001 | Kang | 47/81 |
| 6,584,730 | B1* | 7/2003 | Mai | 47/79 |
| D485,207 | S * | 1/2004 | Dion | D11/143 |
| 2006/0230678 | A1 | 10/2006 | Ellis-El | 47/79 |
| 2007/0119097 | A1 | 5/2007 | Brandstatter | 47/65.5 |

FOREIGN PATENT DOCUMENTS

| | | |
|---|---|---|
| CN | 2216738 Y | 1/1996 |
| CN | 1969609 A | 5/2007 |
| CN | 200976774 Y | 11/2007 |
| DE | 1 955 695 | 2/1967 |
| DE | 79 10 979 | 9/1980 |
| DE | 299 16 691 U1 | 2/2000 |
| DE | 20 2005 012 842 U1 | 8/2005 |
| DE | 20 2005 108 519 U1 | 11/2005 |
| DE | 10 2006 048 756 B3 | 10/2006 |
| EP | 1 790 212 | 5/2007 |

OTHER PUBLICATIONS

EPO Search Report for companion EP case, Officer Norbert Michels, on Feb. 24, 2011 The Haag, 6 pgs.
English Abstract of CN 2216738 Y (1 page).
English Abstract of CN 200976774 Y (1 page).
Office Action for companion CN case 2009101791112 with English translation of text.

* cited by examiner

*Primary Examiner* — T. Nguyen
(74) *Attorney, Agent, or Firm* — James B. Conte; Husch Blackwell LLP (57) ABSTRACT

The invention relates to an insert container for plant pots with a base, at least one side wall, which adjoins the base with a lower edge, is formed with an upper edge open at the top and surrounds an interior, a longitudinal axis extending perpendicular to the base, supports arranged on the base and extending in the direction of the longitudinal axis, at least one water-permeable watering device arranged on the base and at least one indentation which extends in the direction of the longitudinal axis, in the at least one side wall.

12 Claims, 10 Drawing Sheets

INSERT CONTAINER

FIELD OF THE INVENTION

The invention relates to an insert container for plant pots.

BACKGROUND ART

A plant pot is known from DE 299 16 691 U1, which has an outer container, in which an intermediate base is inserted, which delimits a water storage space between itself and the base of the outer container. Plants planted in the plant pot can supply themselves with water from this water storage space for a relatively long time. These plant pots have proven very successful in practice. However, their production is relatively expensive.

SUMMARY OF THE INVENTION

The invention is therefore based on the object of making this system of independent watering accessible for any cachepots.

This object is achieved by an insert container for plant pots with a base, at least one side wall, which adjoins the base with a lower edge, is formed with an upper edge open at the top and surrounds an interior, a longitudinal axis extending perpendicular to the base, supports arranged on the base and extending in the direction of the longitudinal axis, at least one water-permeable watering device arranged on the base and at least one indentation which extends in the direction of the longitudinal axis, in the at least one side wall. The core of the invention consists in providing an insert container, which can be inserted in any cachepot and, when inserted, separates an interior for planting a plant from a water storage space formed below it.

A circular cross-section corresponds to a conventional shape for cachepots.

An insert container made of plastics material is likewise simple to manufacture and moisture-resistant.

The plants planted in the insert container can allow their roots to grow into the water storage space over watering devices, which are formed as pot-like recesses in the base.

Features and details of the invention emerge from the description of a plurality of embodiments with the aid of the drawings.

DESCRIPTION OF THE PREFERRED EMBODIMENTS

A first embodiment of the invention will be described below with reference to FIG. 1 to 6. An insert container 1 for plants can be inserted in a cachepot 2. The cachepot 2 has a cachepot base 3 and a cachepot side wall 4.

The insert container 1 is made of a water-resistant material, in particular of plastics material. The insert container 1 may be produced from a recycled material.

The insert container 1 has a base 5 and at least one side wall 6, which adjoins the base 5 with a lower edge 7, is formed with an upper edge 8 open at the top and surrounds an interior 9 for planting. The insert container 1 has a longitudinal axis 10 extending perpendicular to the base 5. The side wall 6, apart from an indentation 11 extending in the direction of the longitudinal axis 10, is rotationally symmetrical with respect to the longitudinal axis 10. It is, in particular, hollow cylindrical. However, it may preferably be formed slightly conically tapering and therefore have a smaller periphery in the region of the lower edge 7 than in the region of the upper edge 8.

The upper edge 8 preferably has a round, in particular annular, in particular circular ring-shaped cross section. The upper edge 8 is formed as a peripheral edge web 30.

The indentation 11 is concave, viewed from the interior 9 of the insert container 1. However, it is conceivable to make the indentation 11 level. Other embodiments of the indentation 11 are also conceivable. The indentation 11, together with a part of the cachepot side wall 4, forms a water filling shaft 12, which extends over the entire length of the insert container 1. The water filling shaft 12 is covered by a cover-like covering 13 in the region of the upper edge 8 of the insert container 1. Two water filling openings 14, 15 are formed in the covering 13. An additional opening 16 for a water level indicator 17 is formed between these two water filling openings 14, 15. The water level indicator 17 is therefore arranged in the water filling shaft 12 outside the interior 9.

The water level indicator 17 comprises a tube 18, in which a floater 19 with an indicator rod 20 fastened thereon is arranged. The indicator rod 20 projects through the opening 16 and is visible from the outside through a transparent display portion 21. The display portion 21 has various markings 22, which give an indication of the filling level of the water in the cachepot 2. The tube 18 is closed at its lower end with a water-permeable closure cap 23. The tube 18 is held by an upper collar 24 in the opening 16, so it has a defined rigid position relative to the opening 16.

The insert container 1, at its base 5, has downwardly projecting supports 25, which are hollow but closed at the bottom. According to the first embodiment, the insert container 1 has four supports 25. A different number of supports is also possible, however. It is conceivable, in particular, to configure the insert container 1 with three supports 25. The insert container 1 is supported on the cachepot base 3 by means of the supports 25. The supports 25 extend in the direction of the longitudinal axis 10 out of the interior 9 proceeding from the base 5.

Below the base 5 and separated by this from the interior 9, a water storage space 26 is formed by the supports 25. The water storage space 26 is outwardly limited by the cachepot 2. Watering devices 27 for the transfer of water from the water storage space 26 into the interior 9 of the insert container 1 are also formed in the base 5 of the insert container 1. The watering devices 27 are formed by hollow, in other words pot-like recesses which taper in a truncated cone shape, in the base 5. They project into the water storage space 26. The watering devices 27 have slot-shaped water through-openings 28. In the embodiment according to FIG. 1 to 6, two watering devices 27 are provided. A different number is also possible. The number of watering devices 27 depends, in particular, on the size of the insert container 1 and the water requirement of the plants planted therein. It is also advantageously conceivable, to arrange a larger number of watering devices 27 on the base 5 of the insert container 1, it being possible to close these if necessary by covering plates. The watering device 27 in each case has an extent in the direction of the longitudinal axis 10, which is at most as large as that of the supports 25. The watering device 27 is preferably shorter than the supports 25 by 0.5 cm to 3 cm.

Moreover, small water return openings 29 are formed on the base 5 of the insert container 1, through which excess water can run out of the interior 9 of the insert container 1 into the water storage space 26.

The insert container 1 also has a handle element 31 which can be pulled out in the direction of the longitudinal axis 10 and is arranged in the region of the upper edge 8. With regard to the handle element 31, reference is made to EP 1 790 212 B1. In contrast to EP 1 790 212 B1, the handle element 31 is, however, formed as a peripheral ring 36, which rests on the edge web 30. The ring 36 is connected via two longitudinal bars 33, which are guided through guide openings 34 in the upper edge 8. The two longitudinal bars 33, which are parallel to one another, are connected to one another at their end opposing the ring 36 by a crossbar 32. The crossbar 32 is adapted to the outer contour of the insert container 1, in other words bent.

For use, the insert container 1 is filled with a substrate, for example with earth and/or a suitable granulate and planted. It is then inserted in a cachepot 2. Water is poured into the water filling shaft 12 through the water filling openings 14, 15 and thus arrives in the water storage space 26 under the interior 9 of the insert container 1. Water from the water storage space 26 can arrive in the interior 9 of the insert container 1 through the watering device 27. The plants planted in the insert container 1 can thus independently supply themselves with water from the water storage space 26 by means of their roots.

A second embodiment of the invention will be described below with reference to FIG. 7 to 9. Identical parts receive the same reference numerals as in the first embodiment, to the description of which reference is hereby made. In contrast to the first embodiment, in the second embodiment, two handle elements 31 are provided, in each case extending over an arc of a circle portion of the upper edge 8. The arc of a circle portion of the handle elements 31 in each case has a centre point angle in the range of 30° to 90°, in particular in the range of 45° to 60°. In principle, more than two handle elements 31 may also be provided. In this case, two respective handle elements 31 are arranged on the upper edge 8 of the insert container 1 diametrically with respect to one another.

The handle elements 31 have two crossbars 32 arranged in parallel with one another and two longitudinal bars 33 arranged perpendicular thereto. The two longitudinal bars 33 are preferably formed in one piece with one of the crossbars 32. They are rigidly connected to the other crossbar 32, in particular glued. The crossbars 32 and the longitudinal bars 33 are adapted to the outer contour of the insert container 1. The longitudinal bars 33 are guided through guide openings 34 in the upper edge 8 of the insert container 1.

The upper crossbars 32 of the handle elements 31 can be received in openings 35 in the upper edge 8 of the insert container 1. In the inserted state, they are thus integrated in the upper edge 8 of the insert container 1. This leads to a particularly aesthetically pleasing overall impression.

Figure 1:
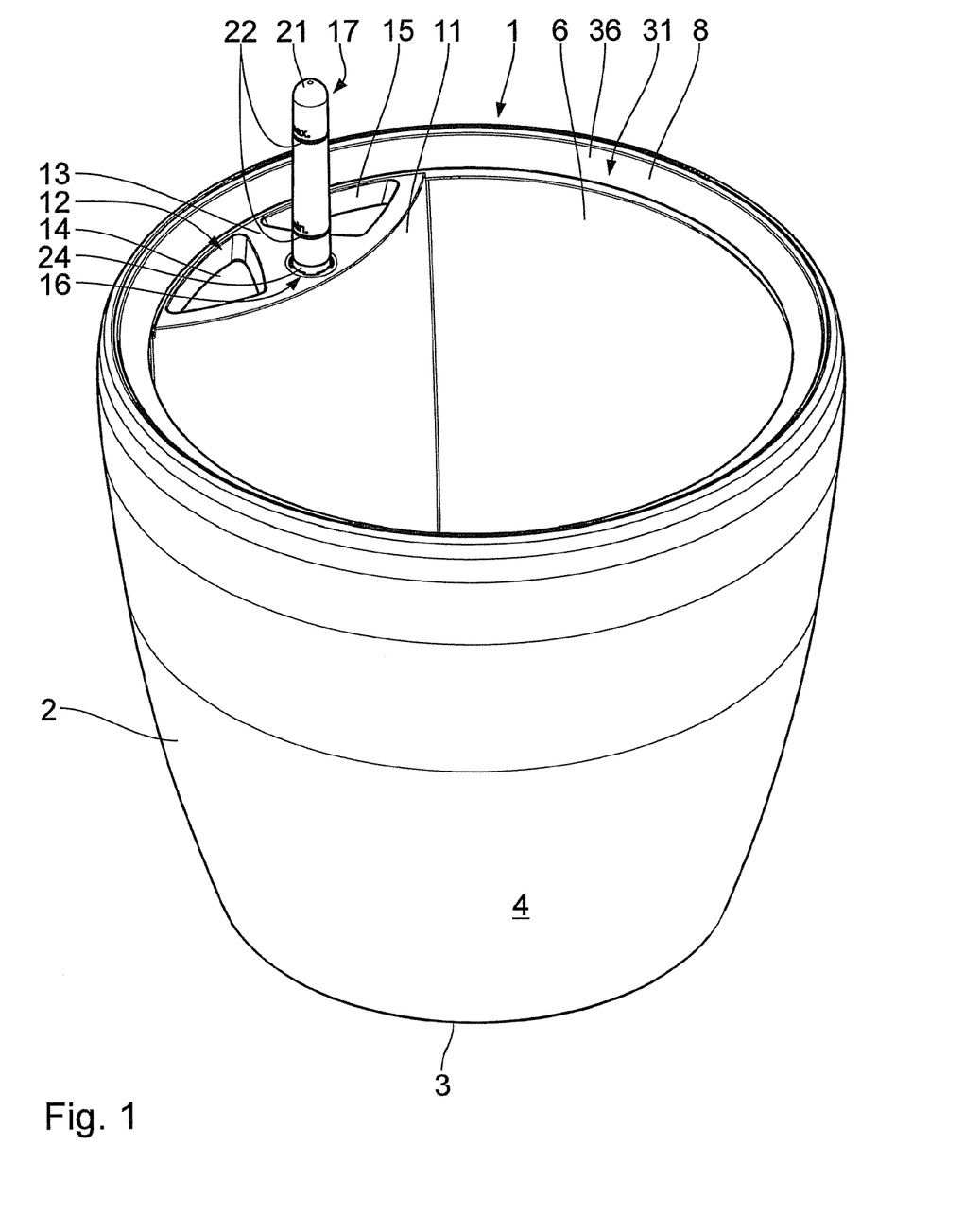
FIG. 1 shows an overall view of an insert container inserted in a cachepot according to a first embodiment.
Figure 2:
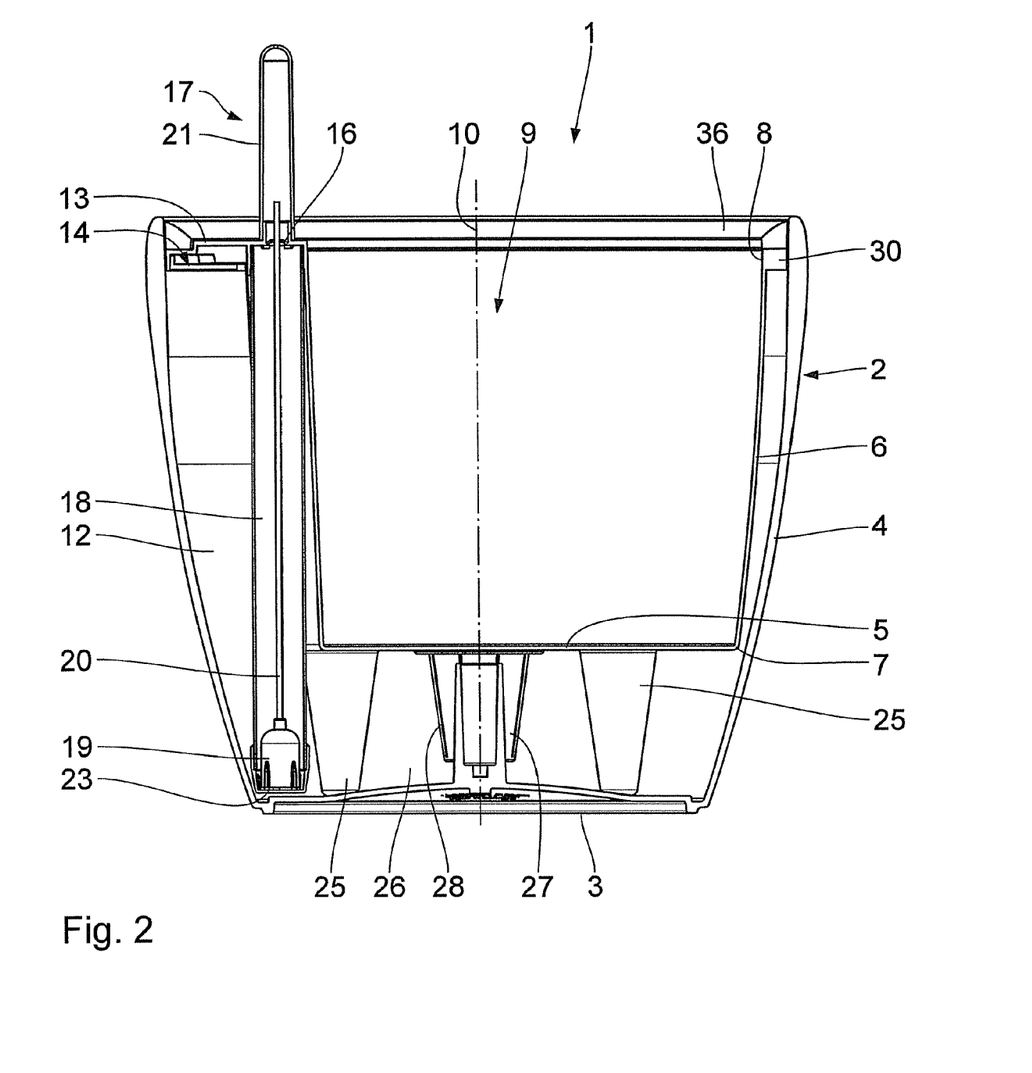
FIG. 2 shows a sectional view of an insert container according to FIG. 1 inserted in a cachepot.
Figure 3:
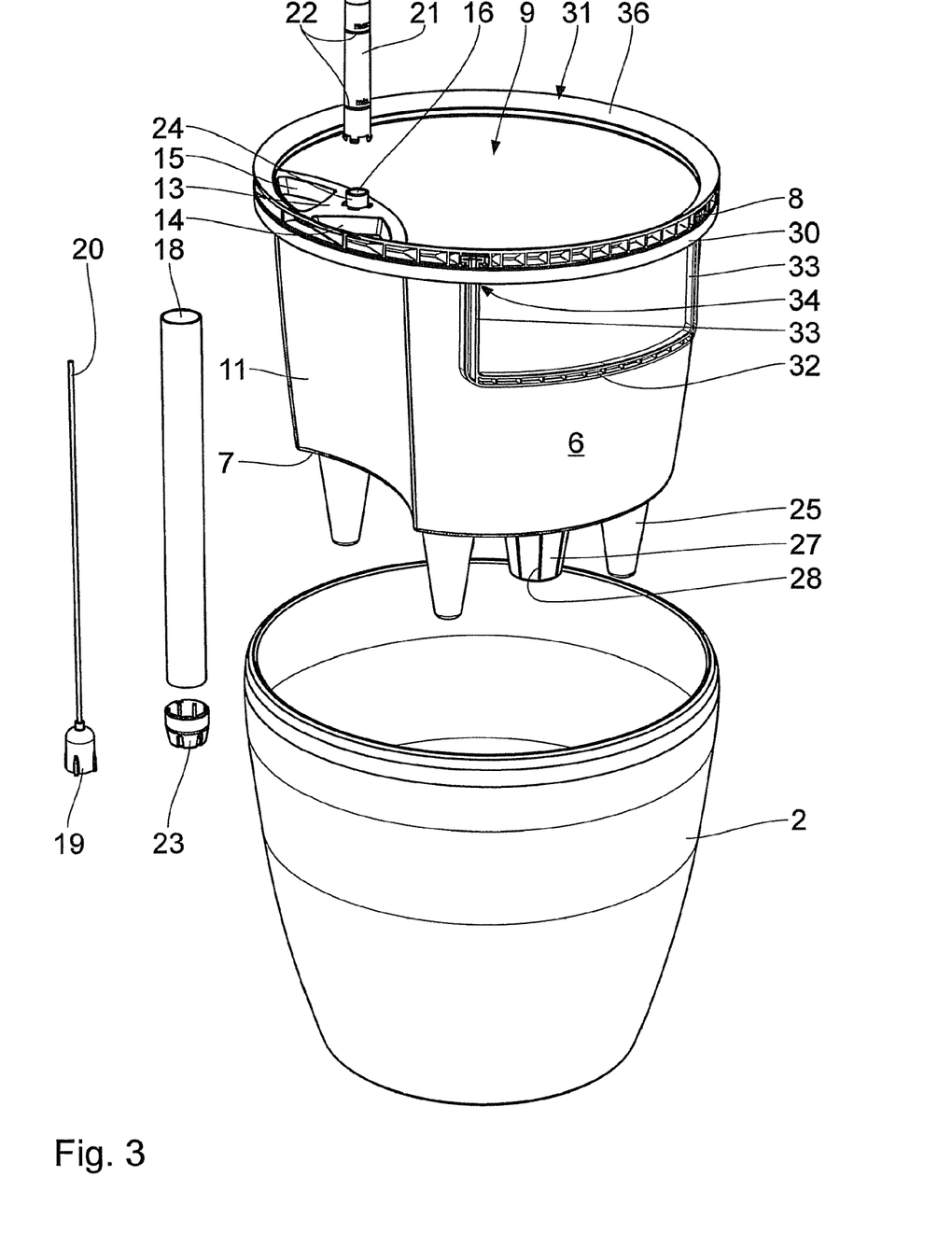
FIG. 3 shows an exploded view of the embodiment according to FIG. 1.
Figure 4:
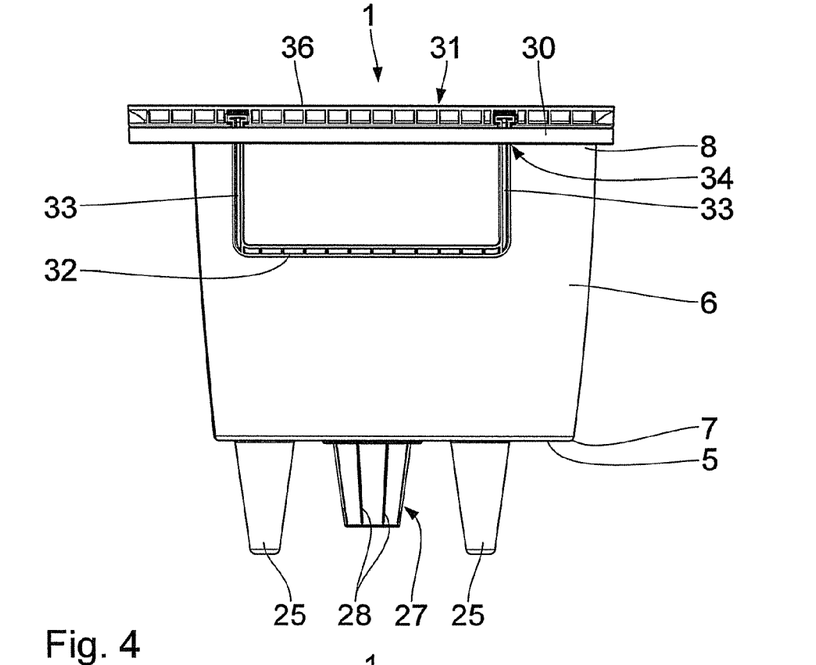
FIG. 4 shows a first side view of the insert container according to FIG. 1.
Figure 5:
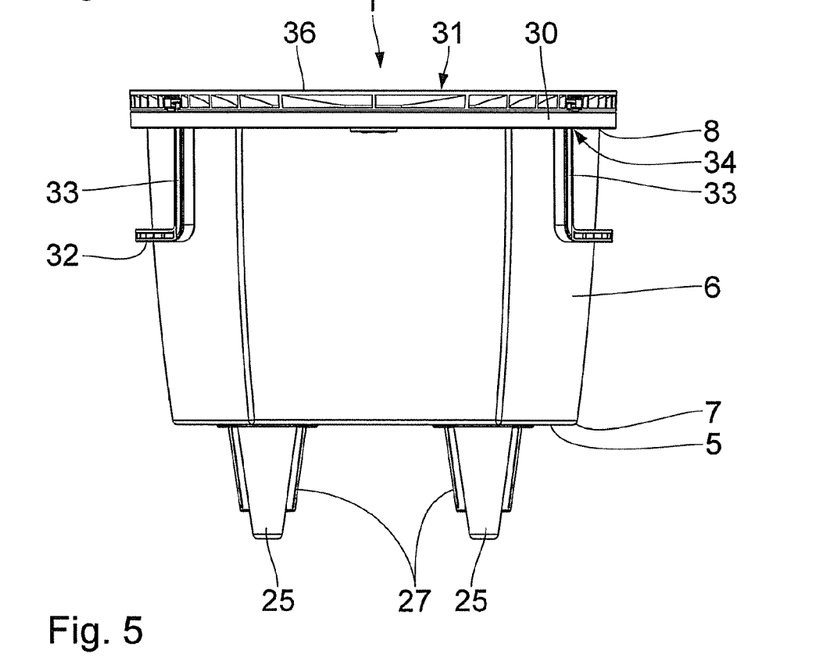
FIG. 5 shows a second side view of the insert container according to FIG. 1 rotated through 90°.
Figure 6:
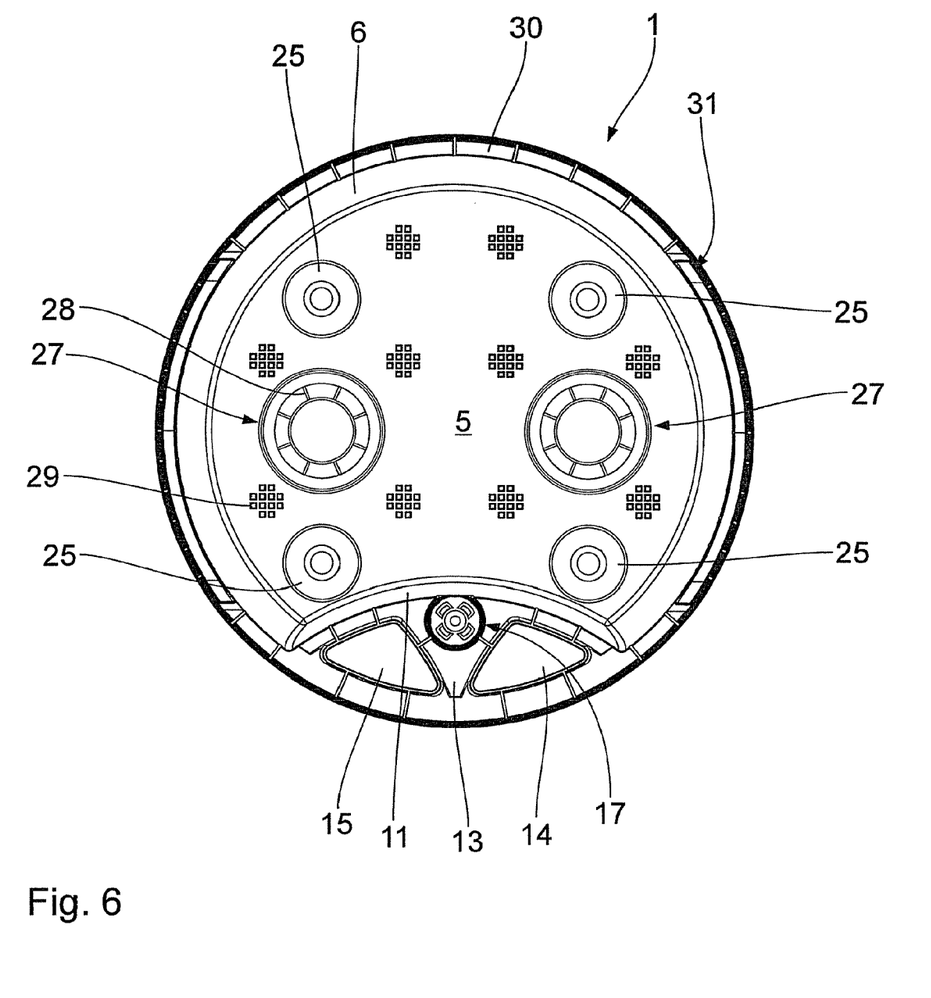
FIG. 6 shows a view from below of the insert container according to FIG. 1.
Figure 7:
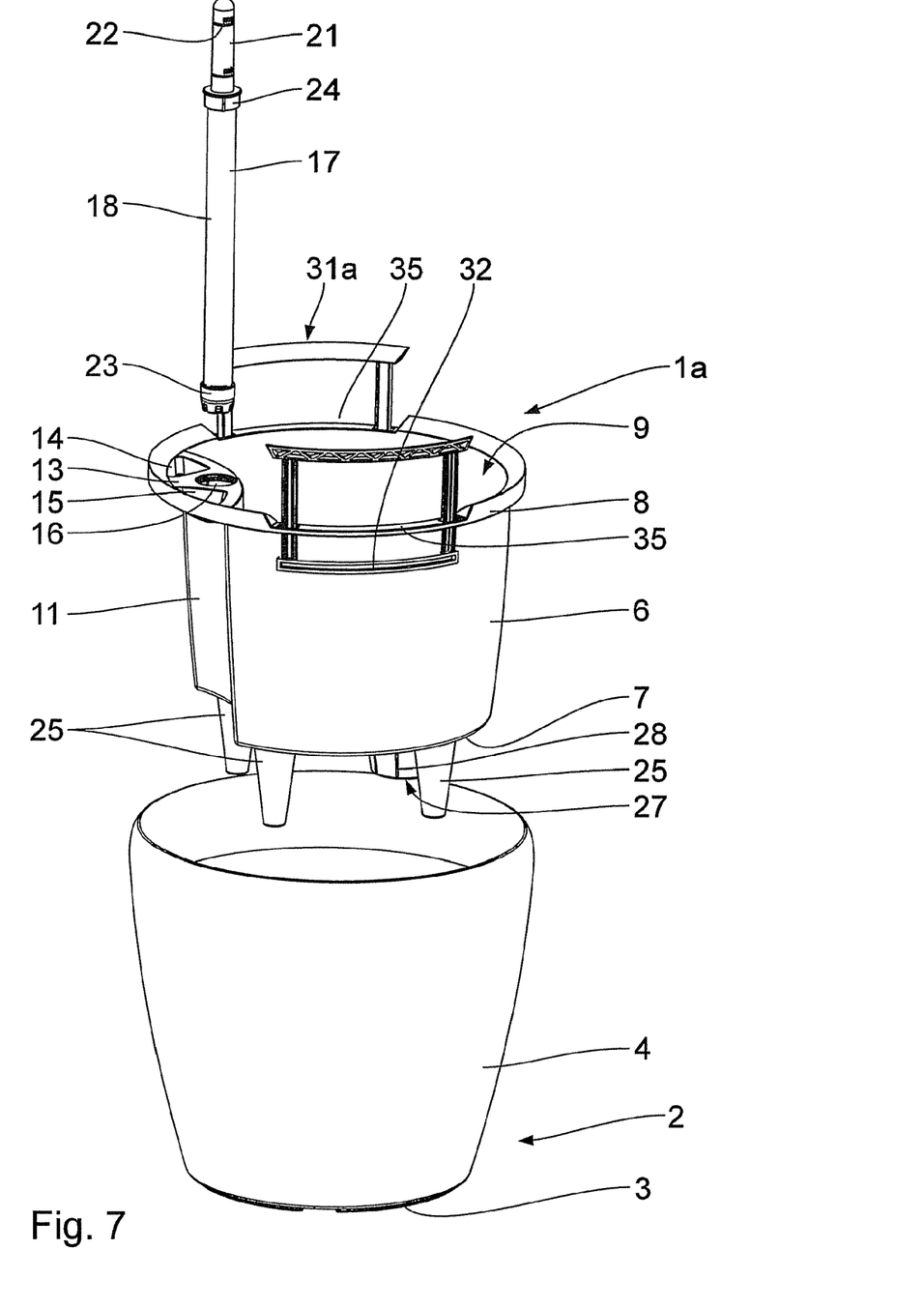
FIG. 7 shows a view according to FIG. 3 according to a second embodiment.
Figure 8:
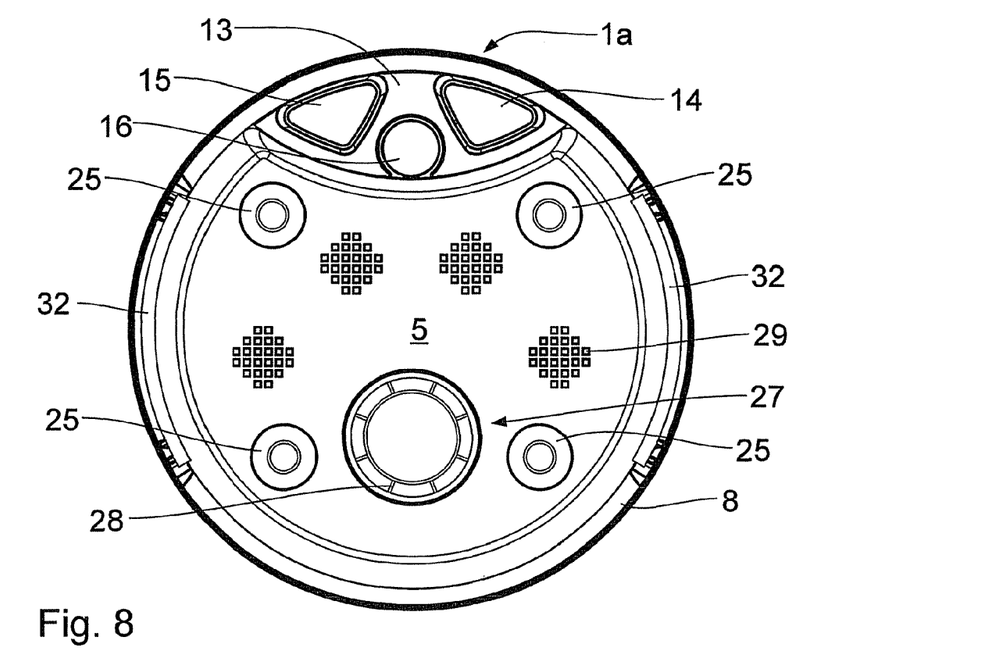
FIG. 8 shows a view from above of the insert container according to the second embodiment.
Figure 9:
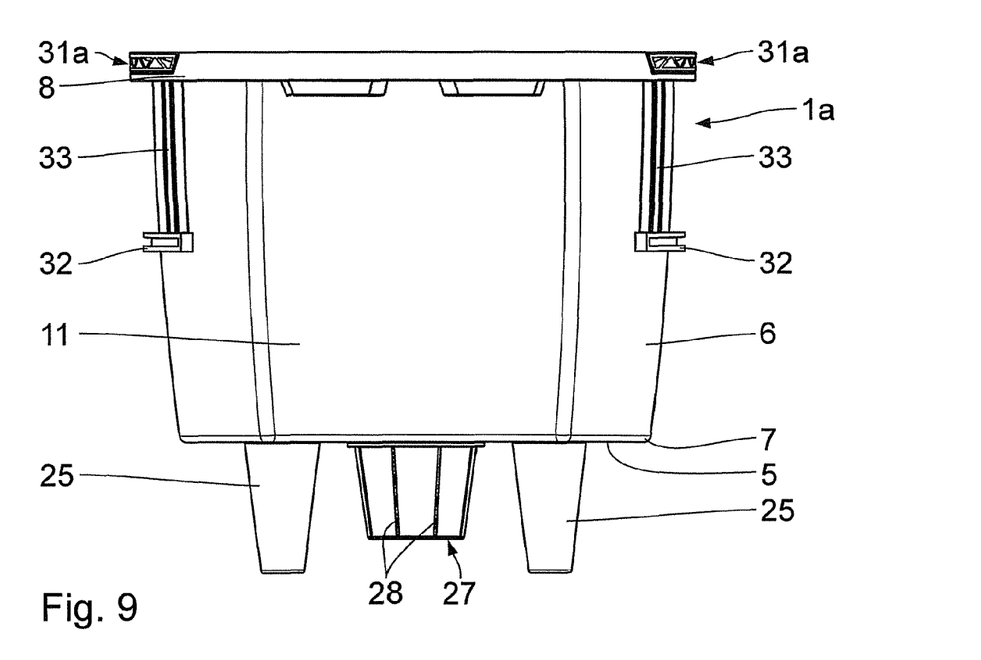
FIG. 9 shows a side view of the insert container according to the second embodiment.

Only one watering device 27 is provided in the second embodiment according to FIG. 7 to 9.

Figure 10:
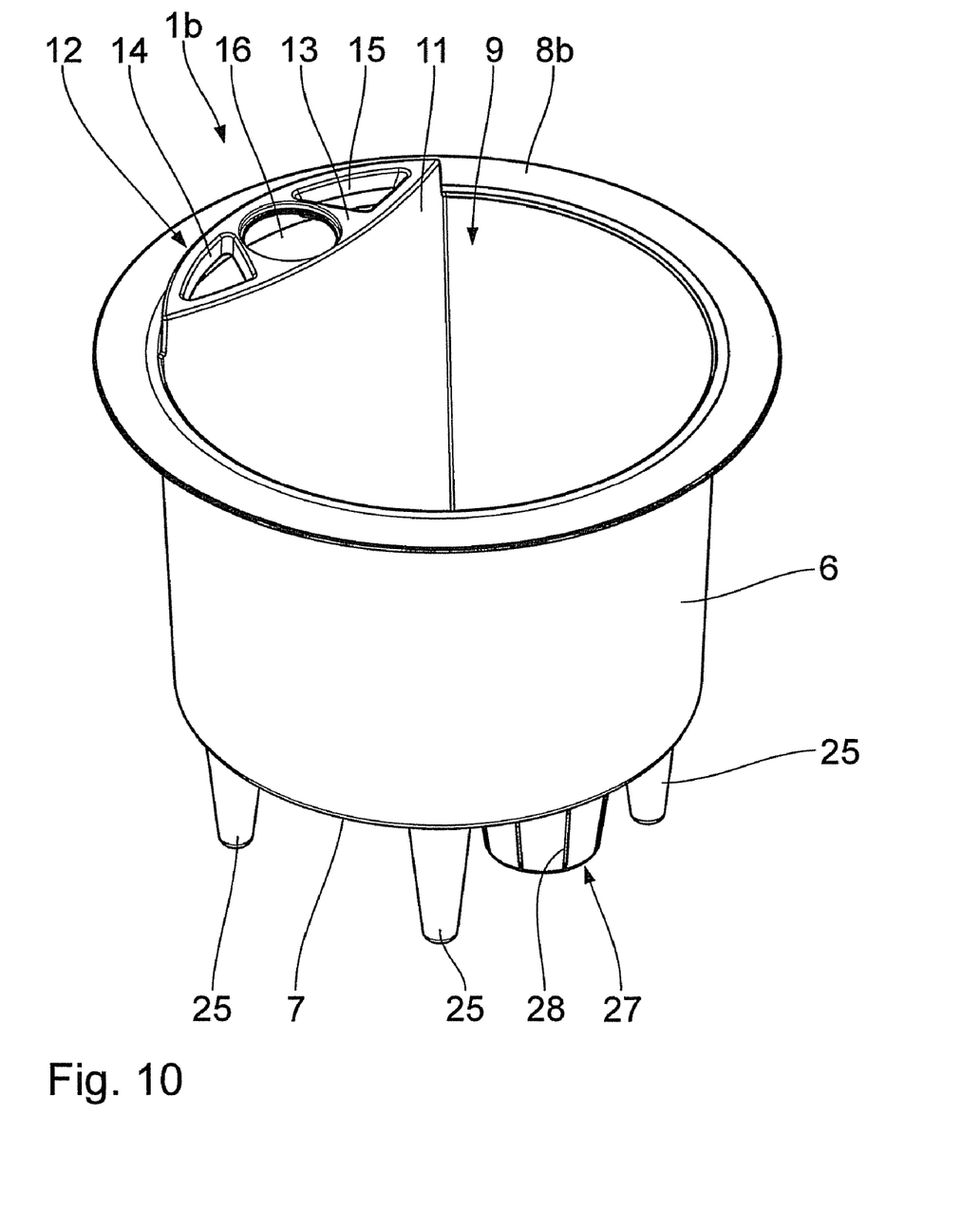
FIGS. 10, 11, 12 show views of an insert container according to a third embodiment of the invention.
Figure 11:
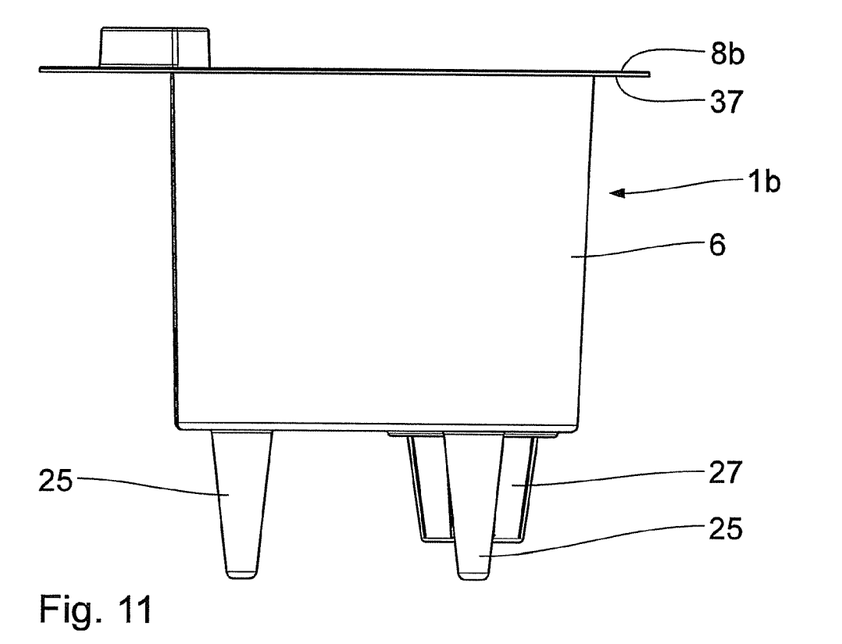
Figure 12:
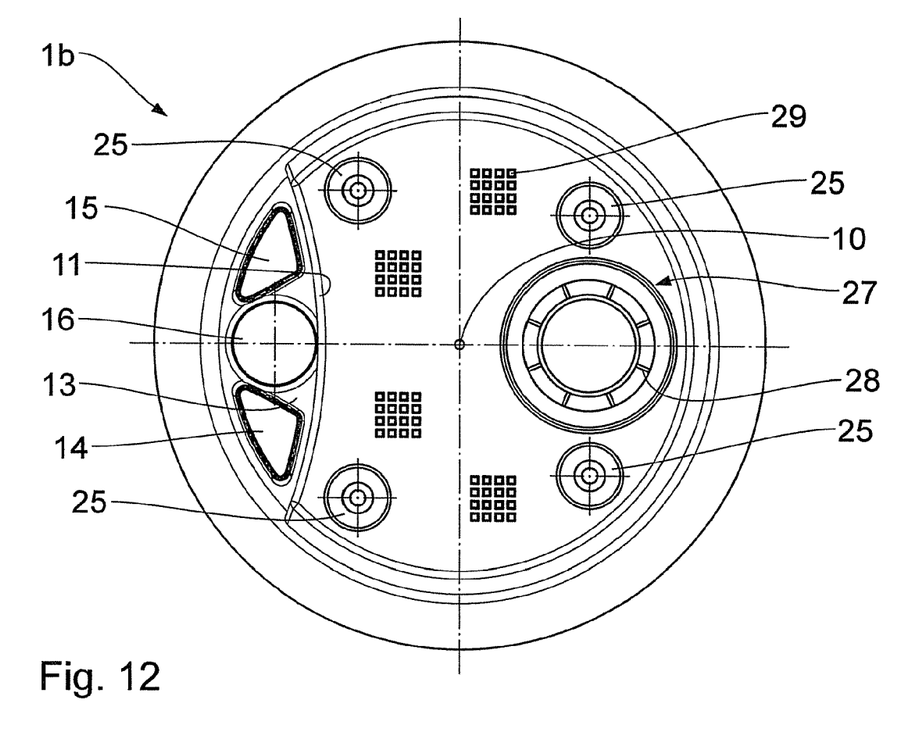

A third embodiment of the invention will be described below with reference to FIG. 10 to 12. Identical parts receive the same reference numerals as in the first embodiment, to the description of which reference is hereby made. Structurally different, but functionally similar parts receive the same reference numerals with a b placed afterwards. In the third embodiment, the upper edge 8b is flat. It runs perpendicular to the longitudinal axis 10 and projects laterally by a projection 37 over the side wall 6 of the insert container 1b. As a result, an intermediate space remaining between the insert container 1 and the cachepot 2 can be covered, and this leads to a more pleasing appearance.

The water filling shaft 12 projects over the upper edge 8b in the third embodiment. The upper edge 8b forms a sealing lip. According to the invention it is provided that the insert container 1b in the cachepot 2 is filled with substrate to over the edge 8b. The insert container 1b is then invisible except for the water filling shaft 12.

Figure 13:
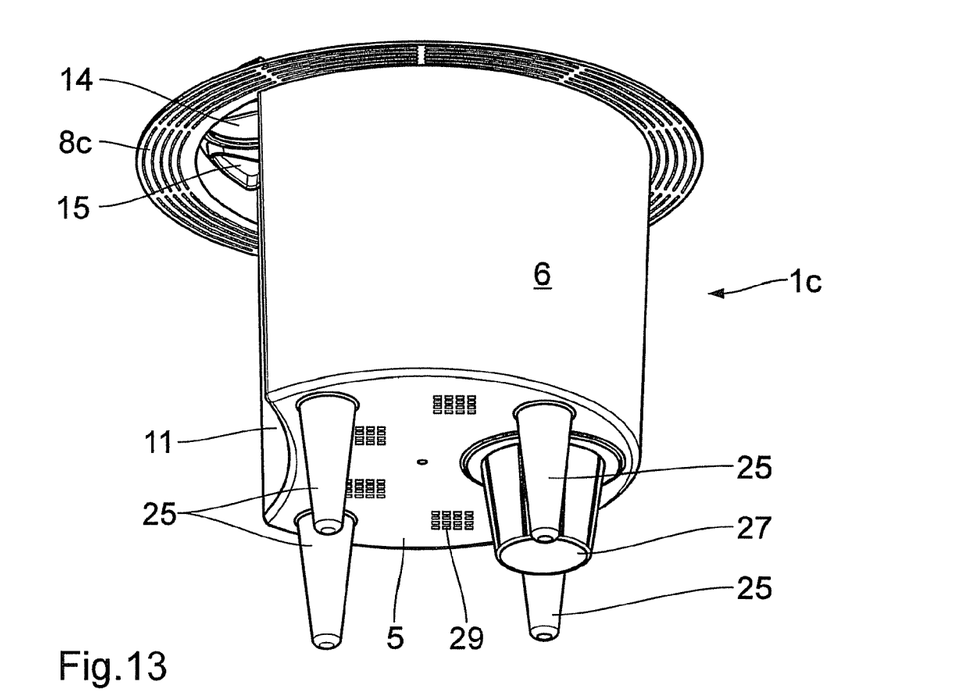
FIGS. 13 and 14 show views of an insert container according to a fourth embodiment of the invention.
Figure 14:
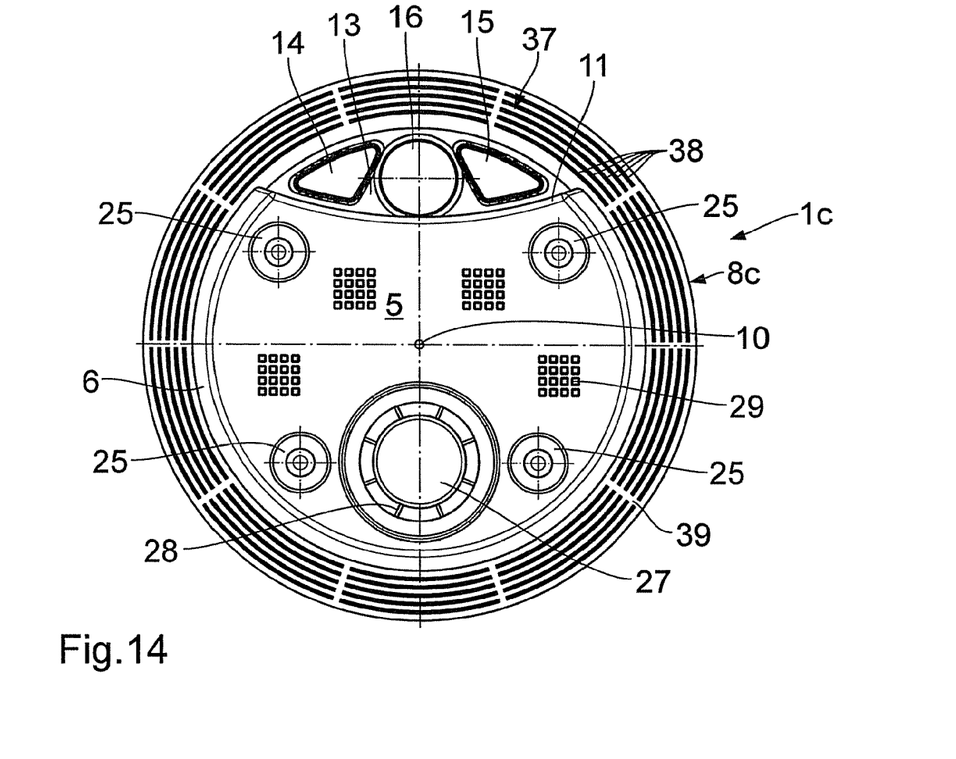

A fourth embodiment of the invention will be described below with reference to FIGS. 13 and 14. Identical parts receive the same reference numerals as in the third embodiment, to the description of which reference is hereby made. In the fourth embodiment, the projection 37 is lamellar. It comprises a plurality of lamellae 38 arranged concentrically with respect to one another, which are connected via webs 39 extending radially with respect to the longitudinal axis 10, to one another and to the side wall 6 of the insert container 1c. These webs 39 can easily be separated, so the upper edge 8c receives an adaptable diameter. The insert container 1c is therefore flexibly adaptable to cachepots 2 with different diameters.

What is claimed is:
1. An insert container (1) for plant pots with
   a. a base (5),
   b. at least one side wall (6), which
      i. adjoins the base (5) with a lower edge (7),
      ii. is formed with an upper edge (8) open at the top and
      iii. surrounds an interior (9),
   c. a longitudinal axis (10) extending perpendicular to the base (5),
   d. supports (25) arranged on the base (5) and extending in the direction of the longitudinal axis (10),
   e. at least one water-permeable watering device (27) arranged on the base (5) and
   f. at least one indentation (11) which extends in the direction of the longitudinal axis (10), in the at least one side wall (6),
   g. wherein at least one handle element (31) is provided in the region of the upper edge (8),
      i. wherein the at least one handle element (31) can be pulled out in the direction of the longitudinal axis (10),
      ii. wherein the at least one handle element (31) is a peripheral ring (36) which surrounds the longitudinal axis.

2. An insert container (1) according to claim 1, wherein the upper edge (8) has a round cross section.

3. An insert container (1) according to claim 1, wherein the upper edge (8) has an annular cross section.

4. An insert container (1) according to claim 1, wherein the upper edge (8) has a circular ring-shaped cross section.

5. An insert container (1) according to claim 1, wherein it is manufactured from plastics material.

6. An insert container (1) according to claim 1, wherein the watering device (27) is formed as a pot-like recess with water through-openings (28).

7. An insert container (1) according to claim 6, wherein the water through-openings (28) are slot-shaped.

8. An insert container (1) according to claim 1, wherein the indentation (11) is concave, viewed from the interior (9).

9. An insert container (1) according to claim 1, wherein a water level indicator (17) is arranged in the region of the indentation (11) outside the interior (9).

10. An insert container (1) according to claim 1, wherein the upper edge (8) extends outwardly proceeding from the side wall (6).

11. An insert container (1; 1a; 1b; 1c) according to claim 1, wherein the upper edge (8c) is lamellar.

12. An insert container (1; 1a; 1b; 1c) according to claim 1, wherein the upper edge (8c) has an adaptable diameter.

* * * * *